Nov. 24, 1959     R. G. ENGLE, JR     2,913,760
DEVICE FOR FILLETING FISH

Filed Sept. 11, 1956     3 Sheets-Sheet 1

*INVENTOR.*
ROLLIN G. ENGLE JR.
BY
Christy, Parmelee & Strickland
ATTORNEYS.

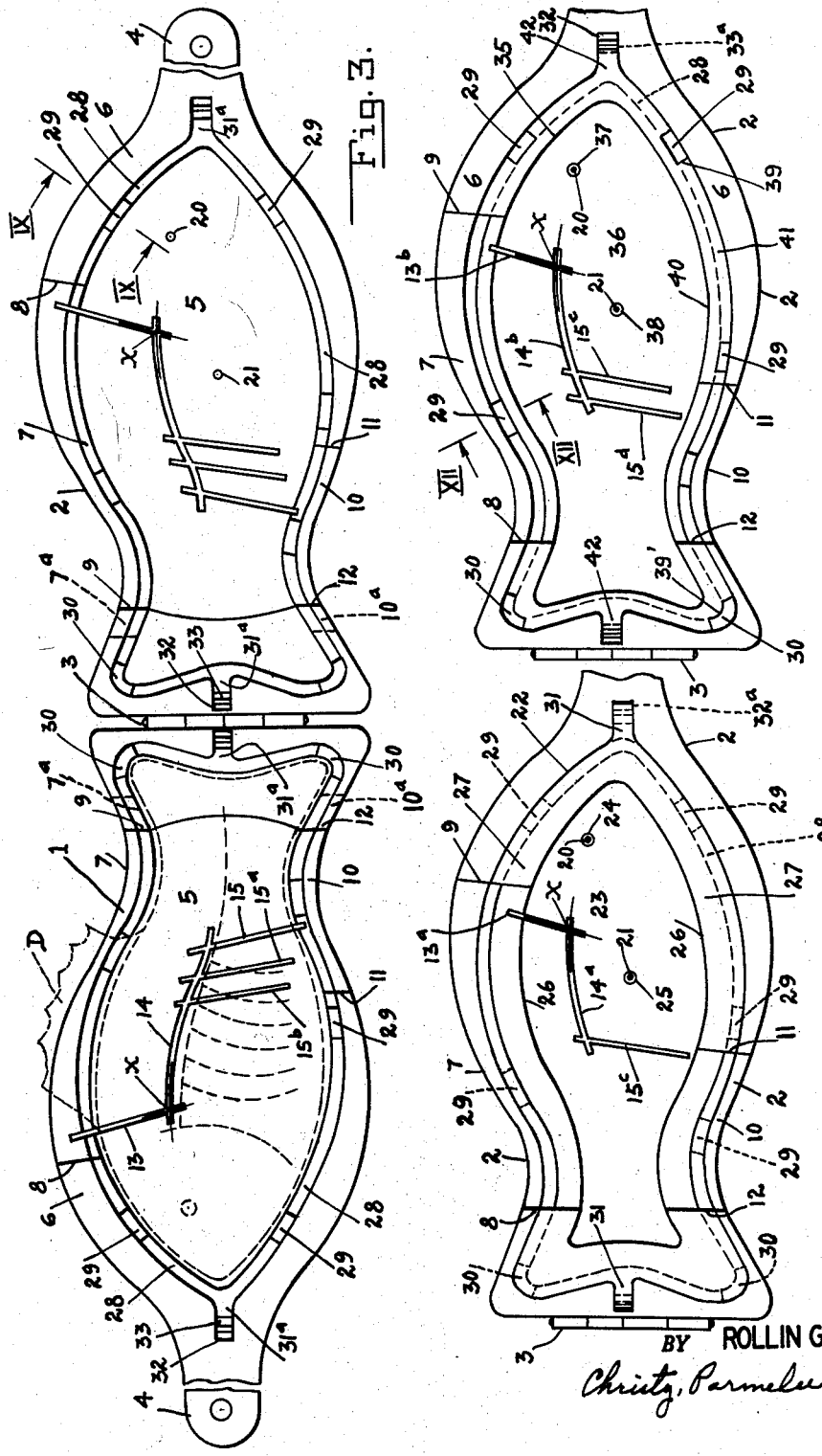

INVENTOR.
ROLLIN G. ENGLE JR.
BY
Christy, Parmelee & Strickland,
ATTORNEYS.

United States Patent Office 2,913,760
Patented Nov. 24, 1959

2,913,760

DEVICE FOR FILLETING FISH

Rollin G. Engle, Jr., Zelienople, Pa.

Application September 11, 1956, Serial No. 609,226

7 Claims. (Cl. 17—8)

This invention pertains generally to the preparation of fish as food and more specifically to a device for holding a fish and cutting therefrom boneless fillets.

The cleaning and preparation of fish for cooking and eating is laborious and requires considerable skill in order to remove from the fish the edible portion free of bones before discarding the waste portions of the fish.

The present invention proposes a template for receiving the fish and provided with suitably placed slotted openings through which a knife blade is inserted and moved from end to end of the slots to sever from the fish the edible portions free of bones and other waste portions of the fish. The template may be provided with inserts which properly position selected sizes of fish for the fillet cutting operation.

One object of the invention is to provide a template for fully enclosing the fish and provided with guide openings through which a knife may be moved in severing boneless edible portions from a fish.

Another object of the invention is to provide suitable inserts for a template of the character described whereby the template is made adjustable as to smaller sized fish to be cut in the same manner as with a fish filling the original size of the template.

A further object of the invention is to provide a device for holding the fish firmly while filleting and without use of the hands to grasp the fish.

These and other objects of the invention will be made apparent from the following description and the drawing forming a part thereof wherein:

Fig. 3 shows a plan view of the template in open position to receive a fish;

Fig. 6 shows a plan view of one half of the template with a small size insert in place;

Fig. 7 shows a similar view of the template with a larger insert in place;

Figure 1:
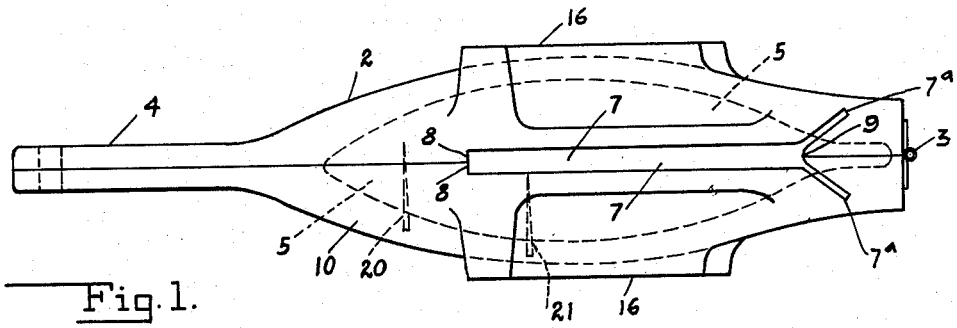
Fig. 1 shows a top view of the template in closed position.

Referring now in detail to the drawing and particularly Figs. 1 to 5 inclusive, the template of the invention is comprised of the members 1 and 2 connected together by a suitable hinge member 3. Each member 1 and 2 terminates in an outwardly extending portion 4 which forms a handle when the template is closed. The members 1 and 2 are substantially identical but complementary to each other so that when the member 2 is folded upon the member 1 they combine to form the template. For this reason a description of the member 1 will suffice for both the members 1 and 2 except where hereinafter specifically noted.

The template member 1 has a central cavity 5 corresponding substantially to the contour of the fish to be received therein. The depth of the cavity 5 is substantially one half the thickness of the fish received therein so that when the members 1 and 2 are superposed they engage the fish between them. The cavity 5 is spaced from the outer faces of the members 1 and 2 by means of a wall 6 which is preferably substantially uniform in thickness transversely of the member 1 but varies in thickness in a direction longitudinally of the member 1 for a purpose hereinafter set forth. The approximate relative relationships between the fish and the cavity 5 of the member 1 is indicated, on Fig. 3, by the dotted lines identifying the fish, its head, ribs, spine and tail.

At the top of the member 1 is a slot 7 extending through the wall 6. The slot 7 is defined by the wall 8 adjacent the head of a fish, within the cavity 5, and the wall 9 adjacent the tail of the largest fish to be received in the cavity. The slot 7 extends substantially straight between the walls 8 and 9 and is recessed below the upper face of the wall 6 in an amount slightly greater than the thickness of the blade of the knife to be inserted therein so as to cut to each side of the dorsal fin D of the fish. At the point 9, the slot 7 has a divergently extending portion 7a so as to bring the cutting knife through the outer surface of the fish to sever therefrom the fillet being cut. It should be noted at this point, upon reference to Fig. 1, that the combined width of slots 7 in the members 1 and 2 permits a cut at each side of the dorsal fin of the fish.

Figure 4:
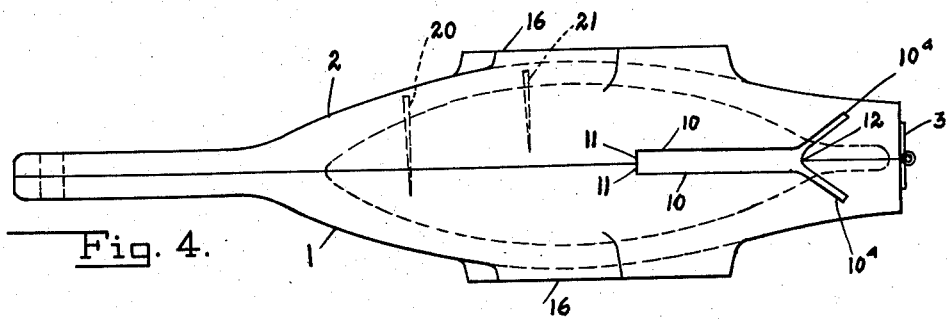
Fig. 4 shows a bottom view of the template in closed position.

At the bottom side of the template member 1, of Fig. 3, is a slot 10 through the wall 6 thereof and defined at one end by the wall 11. The wall 11 is located at a point rearwardly of the ribs of the smallest fish to be received within an insert disposed within the template. The slot 10 extends rearwardly from the wall 11 in a substantially straight line to the wall 12 where it diverges outwardly of the template member 1 at 10a away from the slot so as to sever from the fish the cut made by the knife moving within the slot 10. The width of the slot 10 in member 1 between the walls 11 and 12 of Figs. 3 and 4 is slightly greater than the thickness of the knife to be used in forming the cut.

Figure 2:
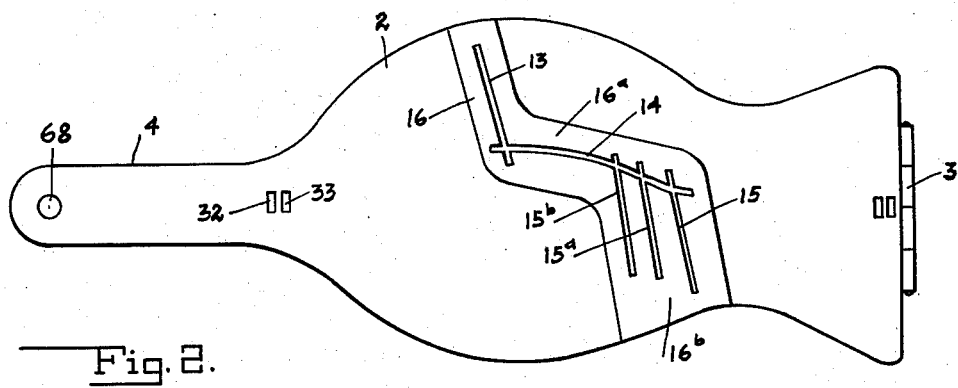
Fig. 2 shows a side elevation of the template in closed position.

Within the cavity 5 of the member 1 are provided a plurality of slots for the purpose of making transverse cuts in the fish and a connecting longitudinal slot as clearly illustrated in Figs. 2 and 3. The slot 13 through the cavity wall 6 of member 1 is disposed rearwardly of the outer gill edge of the head of the fish and extends from a point outside the contour of the fish to adjacent the spine of a fish disposed in the template. The slot 14 is disposed adjacent the spine of the fish within the template cavity or cavity of an insert in the template and extends from the slot 13 to a point rearwardly of the last rib of such fish. Slot 15 extends from the slot 14 to a point outwardly of the periphery of the fish and is disposed rearwardly of the position of the last rib of the largest fish within the template. Slots 15a and 15b are similarly disposed relative to a medium size and smallest size fish to be placed in the template and correspond to slots in the template inserts, as hereinafter discussed. It will be noted from an examination of Figs. 2 and 3 that the slots 13, 14 and 15 at their intersection with each other extend beyond the intersecting slot so that the flesh of the fish may be completely severed at the intersection of such cuts made through the respective slots. The width of the latter slots is slightly greater than the knife blade to be received therein. The point X, at the intersection of slots 13 and 14, disposed rearwardly of and adjacent to the outer gill edge of the largest fish, received in the template, is a fixed and common point for each size of fish and of the slots of inserts hereinafter discussed.

Figure 5:
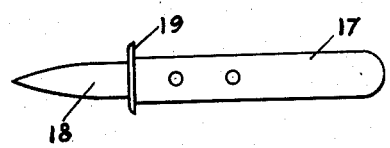
Fig. 5 shows a suitable form of knife for use with the template.

Referring again to Figs. 1, 2 and 4 of the drawing, the slots 13, exteriorly of the template members, are surrounded by embossments or raised portions 16 and corresponding embossments 16a and 16b are disposed around the slots 14, 15, 15a and 15b. The slots 13, 14 and 15, 15a and 15b extend completely through the wall 6 of each template member 1 and 2 and the embossment 16, 16a and 16b thereon. The heights of the embossments 16, 16a and 16b are so calculated that with a fixed length of knife blade (Fig. 5) the cuts made on either side of the fish will overlap and completely sever at the proper depth the fillets being cut. The knife is shown in Fig. 5 of the drawings as having a handle portion 17 and a double edged blade portion 18. At the point where the knife blade enters the handle 17 is a guard 19 mounted on the handle and which bears against the template embossments so as to measure the depth of cut made by the blade. Referring now to Fig. 3 of the drawing it will be noted that spikes 20 and 21 are mounted only in the cavity 5 of the member 2 and are of sufficient length to extend partly through the fish and hold it in fixed relation during the cutting operations. The spike 20 entering the head of the fish kills it as the template is closed.

Figure 8:
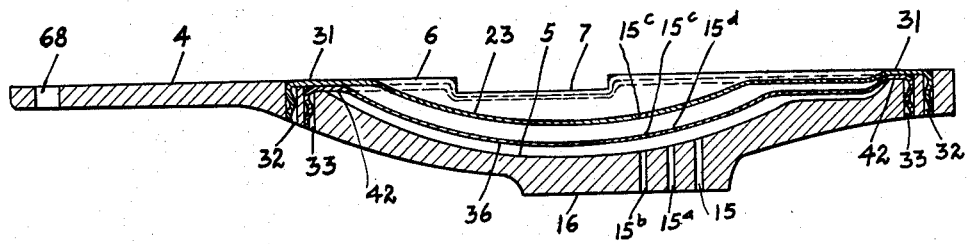
Fig. 8 shows a longitudinal view through one half of the template with both inserts in place.
Figure 12:
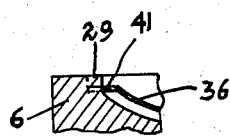
Fig. 12 shows a cross section taken on lines XII—XII of Fig. 7.
Figure 9:
Fig. 9 shows a cross section through the template of Fig. 3 taken on lines IX—IX.

Referring now to Fig. 6 of the drawings, a small size insert 22 is shown as being positioned in template member 2 to receive and hold the smallest size fish to be filleted in the template. It is to be understood that similar insert will be placed in template member 1 and of a complementary shape. To support these inserts, the template members 1 and 2 are provided with recessed flanges 28 about the cavities 5 therein. As best shown in Figs. 3 and 9, this flange 28 is recessed a distance equal to the combined thickness of the flanges of the inserts to be supported thereon. In order that one insert can be used apart from the other, each flange 28 has raised portions 29 and 30 spaced along the flange. These raised portions are of a height to support the smallest insert 22 in a plane within the horizontal plane of the side walls 6 of the members 1 and 2 as best shown in Fig. 8 of the drawings. At the longitudinal ends of the cavities 5 of members 1 and 2, the flanges 28 are elongated as at 31a for securing the inserts in place upon the members. These elongations are provided with openings 32 and 33 for a purpose hereinafter set forth. The extensions 31a continue in the plane of flange 28 past opening 33 and at opening 32 are in the plane of the raised portions 29 and 30 of flanges 28. The flange 28, at cutting openings 7 and 10, is further recessed to support the inserts below the cutting slots as illustrated in Fig. 8.

Figure 10:
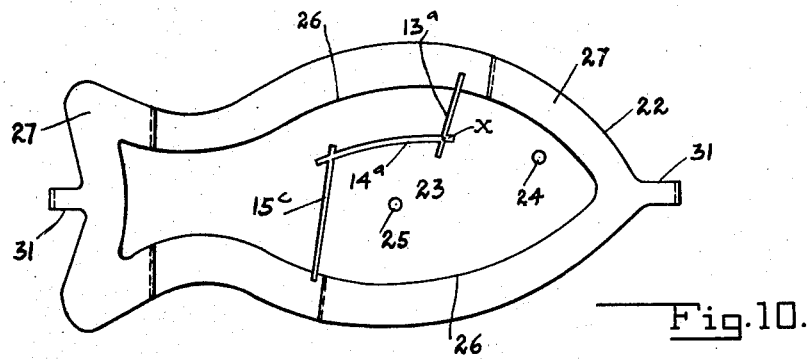
Figs. 10 and 11 show plan views of the template inserts of Figs. 6 and 7.

Referring now to Figs. 6, 8 and 10 of the drawing, the insert 22 is provided with a cavity 23 of a size to receive the smallest fish. The cavity 23 is located relative to cavity 5 of the template member 2 so that the points X of the insert and of the template member are in substantially vertical alignment. Extending outwardly from the top edge 26 of cavity 23 is a flange 27 disposed about the periphery of the cavity. At each longitudinal end of the cavity the flange 27 has outward extensions 31 terminating in depending spring clips 32a engaging the openings 32 of the template members to releasably retain the insert in place. The flange 27 overlaps and is supported on the raised portions 29 and 30 of the template recess or flange 28. Insert flange 27 and the edge 26 of the insert cavity at the cutting slots 7 and 10 of the template members are recessed to lie within or below the plane of the adjacent sides of said slots to avoid interference with the knife blade 18 to be moved therein. Within the walls of cavity 23, the insert 22 is provided with cutting slots 13a, 14a and 15c which are in alignment with the corresponding cutting slots 13, 14 and 15b of the associated template member. Suitable openings 24 and 25 are provided in the cavity of the insert of template member 2 to accommodate passage of spikes 20 and 21.

Figure 11:
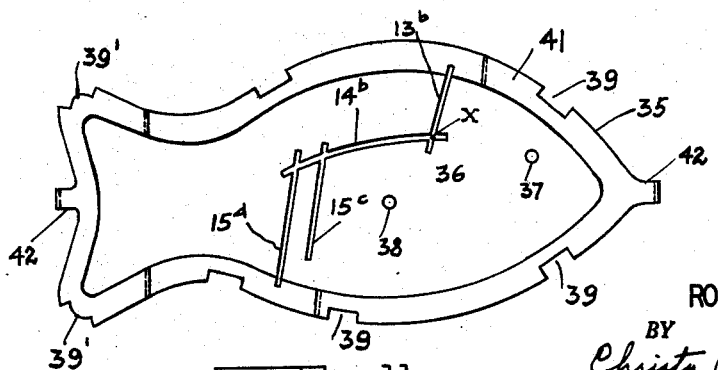

Referring now to Figs. 7, 8 and 11 of the drawing, an insert 35 is shown in place on the associated template member 2 and the insert is of a size to receive an intermediate sized fish. The peripheral dimensions of insert 35 are the same as that of insert 22, its other dimensions are proportioned to the increase in size of its cavity 36 over that of the cavity 23 of the insert 22. Within cavity 36 are openings 37 and 38 receiving the spikes 20 and 21 of the template member 2. Extending outwardly from the upper edge 40 of the cavity 36 is a flange 41 whose outer peripheral edge conforms to and is received upon the recessed flange 28 of the template members 1 and 2. This flange 41 has suitable openings 39 and 39' therein through which extend the raised portions 29 and 30 of flange 28 so that insert flange 41 is supported directly upon flange 28 of member 2. Thus both inserts may be simultaneously supported in each template member when desired as shown in Fig. 8. At opposite longitudinal ends of insert 35 are extensions 42 received in the template member recesses 31a. Said insert extensions terminate in depending spring clips 33a received in the template member openings 33 to retain the insert 35 in place upon said template member. The flange 41 of insert 35, like the flange 27 of insert 22, is recessed at the template cutting slots 7 and 10 for a similar purpose. The wall of the insert cavity is also recessed at these slots as shown in Fig. 8. Extending through the bottom wall of insert cavity 36 are cutting slots 13b, 14b, 15c and 15d which are in alignment with template cutting slots 13, 14, 15a and 15b. The intersection point X of insert cutting slots 13b and 14b is in substantially vertical alignment with the similar point X of the associated template member and the cavity 36 is so proportioned to bring the head of the fish contained therein into the same relative position therewith as in the associated template member.

When using the template, without inserts, the template is first opened and placed in a horizontal position as shown in Fig. 3 of the drawings. The fish is first scaled and then laid in the cavity 5 of the template member 1 as indicated by dotted lines on Fig. 3. The template member 2 is rotated to the left so as to be superposed on the template member 1 with the spikes 20 and 21 penetrating the head and body of the fish. The spike 20 entering the head of the fish will kill same. The template is now positioned as shown in Fig. 2 of the drawings and the portions 4 of the template members 1 and 2 provide a handle for holding the template. The blade 18 of the knife of Fig. 5 is first inserted into one side of the slots 7 (Fig. 1) until portion 19 engages the template and moved back and forward in the slot to sever the flesh of the fish at each side of the dorsal fin. The knife in this case moves from the slot 7 into diverging portion 7a. The knife is then removed and similarly inserted in the opposite side of the slot 7 and moved back and forward entering its diverging slot 7a. During this movement of the knife a depth of cut extends inwardly of the fish to adjacent the back bone and longitudinally of the fish to adjacent the tail thereof where the knife blade moves outwardly through the outer surface of the fish. The template is then turned on its side (Fig. 2) and knife blade 18 inserted for its full depth into the slot 13 with the guard 19 of the knife resting on the embossment 16. The knife is then moved back and forth the full length of slot 13 several times. This movement of the knife makes a cut into the fish in a direction transversely of the fish to adjacent the back bone. The knife is then removed and similarly inserted in slot 14 and run back and forth several times the full length of the slot and thereafter the knife is entered into the slot 15 and similarly moved the length of the slot. The fillet at one side of the fish above the back bone is now completely severed from the fish. The same operation is then performed on the opposite side of the template in the slots 13, 14 and 15. The template then may be turned as in Fig. 4 and the knife inserted at one side of the slot 10 and moved back and forward with the knife entering the divergent slot portion 10a, thereafter the knife is moved to the opposite side of the slot and similarly moved the length of the slot 10 and into its divergent slot 10a. The fillets at each side of the fish are now fully severed therefrom. The template may then be opened again into the position shown in Fig. 3 and the exposed cut portions on the near side of the fish removed. The carcass of the fish may then be removed from the mold leaving the cut portions on the far side of the fish within the mold, which carcass may then be discarded. Thereafter the cut portions may be removed from the mold and another scaled fish inserted in the template member 1. It will be observed by this operation that the head, entrails and tail of the fish are removed as substantially a single piece and substantially the entire edible portions of the fish have been severed from the fish body. Such severed portions are substantially boneless. In such cases as necessary the template may be washed before reusing.

Assuming now that the smallest sized fish which the template will accommodate is to be placed in the template for cutting, the inserts 22 are mounted in members 1 and 2 of the template as shown in Fig. 6. The fish after being scaled is then placed in the cavity of insert 22 of member 1. The mold member 2 and assembled insert are then superposed upon the member 1 so that the spike 20 of the member 2 extending through the contained insert 22 pierces the head of the fish, killing it and the spike 21 assists in holding the fish in fixed relation upon the insert. The combined handle portions 4 are then grasped as in the previous example and the knife blade 18 first inserted at each side of the slot 7 until the guard 19 engages the top of the slot and the knife moved lengthwise of the slot 7 and the diverging portion 7a. The template is then turned on its side for successively placing the knife blade 18 in the slots 13, 14 and 15b and moving the knife lengthwise of such slots and the registering insert slots 13a, 14a and 15c. The knife then is removed and the template turned over and the knife run through the similar slots on the opposite side of the template. Thereafter the template is inverted as in Fig. 4 and the knife run successively along opposite sides of the slot 10 and the diverging portion 10a. The boneless edible portions of the fish have now been severed therefrom as previously described and the template may be opened into the position shown in Fig. 3 and the edible portions and carcass may be removed as in the manner previously described.

Assuming now that a medium size fish is to be cut in the template, the smaller sized inserts 22, if present, are removed and the largest sized inserts 35 and placed in the template members 1 and 2 as shown in Fig. 7. The fish is then scaled and placed into the cavity of the insert of member 1 in the manner previously described and the template member 2 superposed thereon with its spikes 20 and 21 engaging the fish for the previously described purposes. The knife is then inserted successively into the slots 7 and 10 as previously described and also into the side slots 13, 14 and 15a for the purpose and moved in the manner as previously described. The template may then be opened and the severed boneless edible portions of the fish removed and the carcass discarded as previously described.

The function of the inserts is to reduce the cavity of the template to accommodate smaller fish. The reference point X of the template members and of the inserts, by coinciding, properly position the several sized fish as to the back bones and heads thereof so that the knife cuts through the template slots 13 and 14 are uniform as to their relation to these portions of the fish. The slots 15a and 15b vary in location to provide knife cuts immediately to the rear of the last rib of the respective sizes of the fish within the template and inserts. Knife cuts through the slots 7 and 10 may extend beyond the fillets being cut from the smaller fish but do sever the fillets therefrom. In this manner the template and its inserts may be modified in size to accommodate a number of sizes of fish. The only limitation on template size being the unwieldiness of the template if made too large for ready handling.

The template and inserts hereinbefore described will be found by the experienced fisherman, as well as the novice, to be most useful for filleting or removing boneless flesh from the fish when working on the smaller size fish such as a pan fish which are usually caught in large numbers and are difficult to clean by hand. Other small fish such as the blue gill and crappie bass are most advantageously filleted by use of the template. The template however may be made of any size up to a weight of template and fish which can be conveniently mounted in a template and so handled. The location of the respective cutting slots would be proportionately located corresponding to the size and structure of the fish.

The template and its inserts may be made of any suitable material such as a non-corrosive metal, molded plastic or of wood. The length of blade in the knife would of course be proportioned to the size of template provided and the fish therein. The hole 68 in the handle 4 of the template is found useful for hanging the template to dry after use. A convenient storage place for the knife is inside the closed template when not in use.

The use of the template and its inserts have been hereinbefore described on the basis that the template alone would be used for the largest fish and the cavity size of the template members would be modified by selectively using one or the other of the inserts to accommodate the different sizes of fish. As a matter of convenience and to avoid mistakes it is presently considered desirable to provide each template insert with only the cutting slots suited to the specific size of fish being contained within the respective insert. It will be obvious however that the basic template members 1 and 2 will require a sufficient number of cutting slots to accommodate the template for use in working on all of the different sized fish to be contained therein and when the inserts are in position. It may be found desirable to consider the possibility that when a smaller sized fish is to be cut, the larger sized insert would also be in a position within the template. The basic template design provides for this and it would only be necessary to modify the larger sized insert by including therein both cutting slots 15c and 15d.

It is recognized that many possible modifications of the invention may suggest themselves to those skilled in the art after examination of the herein described template and for this reason it is to be understood that the specific details of construction herein provided for are by way of example rather than limitation except as made necessary by the scope of the appended claims.

I claim:

1. A device for holding a fish and cutting boneless fillets therefrom, comprising a pair of oppositely disposed members each having a planar top surface and a hollow concave wall portion depending therefrom defining a cavity having a head simulating end and a tail simulating end corresponding to the contour of one-half the body of a fish to be recived therein, said cavities terminating between the ends of the members, a hinge connection between the members permitting one member to be superposed upon the other with the planar surfaces and cavities thereof in matching relation, each said members at one side of the device having its planar surface recessed to receive a knife blade at one side of the dorsal fin of a fish received in said cavities, each said member planar surface recess extending transversely of the said surface and longitudinally thereof from forwardly of the position of the outer gill edge of the simulated head end of the cavity to adjacent the tail end of the cavity, the latter end of each said recess terminating in a downwardly and outwardly diverging portion extending into the adjacent cavity wall, each said member cavity having a longitudinally extending slotted opening through the wall thereof in outward alignment with the spine of the simulated fish body, said member having a first transversely disposed slotted opening through said wall connecting one end of said longitudinally disposed slotted opening with the adjacent planar surface recess, and a second opposely disposed transverse slotted opening through said wall connecting the opposite end of the longitudinally extending slotted opening with the adjacent planar surface, said latter planar surfaces having recesses therein similar to the recess of the planar surfaces at the opposite side of the member and extending from the transverse slotted opening rearwardly to the tail end of the cavity.

2. The device as defined in claim 1 wherein the outer face of each said members at each said slotted and recessed openings therein is provided with a shaped bearing surface for the handle of a knife blade moving in said openings to determine the depth of penetration of the blade into said member cavity as the blade is moved longitudinally of the opening with the blade handle in bearing engagement with said bearing surface.

3. A device for holding a fish and cutting boneless fillets therefrom, comprising a pair of hingably connected superposable members, each member having a planar surface and a concave wall portion depending therefrom defining a cavity simulating the contour of one-half the body of a fish to be received therein, each said member having intersecting slotted openings extending through the cavity wall portions thereof defining the area of said fillets within the cavity and of a width to receive a knife blade moving the length of said openings in severing the flesh of a fish received in said cavity, and each said member planar surface at opposite sides of the member cavity being provided with a recessed portion extending the length of the adjacent side of said fillet and of a depth not less than the thickness of a knife blade to be received therein.

4. The device as defined in claim 3 wherein the outer face of each said member at said slotted openings and recesses therein has an embossment thereon providing a bearing surface for the handle of a knife blade moving in said openings and recesses, said embossments extending outwardly from the face of the member and determining the depth of penetration of the knife blade into each cavity as the blade is moved longitudinally of the opening with the blade handle in bearing engagement with said embossment bearing surface.

5. A device for holding a fish and cutting substantially boneless edible portions from opposite side surfaces thereof, comprising a pair of connected superposed members each having a planar surface and a concave wall portion extending from said surface defining a cavity simulating the shape of one-half of the body of a fish to be received therein, each said member planar surfaces and cavity wall portions being provided with knife blade receiving slotted openings connecting the outer face of the member with the cavity therein and defining the cuts to be made in the side surfaces of a fish to be received in said cavities, said slotted openings in each member being so disposed and intersecting with one another so that a knife blade moved longitudinally thereof and extending within the member cavity completely severs the said edible portions from a fish body when disposed in said member cavities.

6. The device as defined in claim 5, wherein each of said members have upon the outer face thereof embossments extending from the face of the member at each said slotted openings providing a bearing surface for the handle of a knife blade extending through said slotted openings and into said cavities to define the depth of penetration of the blade into said cavity when the handle is moved longitudinally of said openings in contact with said bearing surface.

7. The device as defined in claim 5, wherein the planar surfaces of said members are provided with means for supporting inserts disposed within said member cavities, an insert disposed within each member cavity and having a concave wall portion defining a cavity simulating the shape of one-half the body of a fish to be received therein, said insert cavity being smaller than the member cavity and having the upper edges of the insert cavity enclosed by a laterally extending wall surface supported by said member, said insert having the wall of the head portion of the cavity therein provided with slotted openings in alignment with the slotted openings in the wall of the said member cavity head and body portions, said insert cavity wall having transversely extending slotted opening substantially parallel with the similarly extending slotted opening in the member cavity wall towards the tail portion thereof and located adjacent the position of the last rib of the fish body simulated by the insert cavity, and said member cavity wall having a transversely extending slotted opening in vertical alignment with said latter insert cavity slotted opening.

References Cited in the file of this patent

UNITED STATES PATENTS

| | | |
|---|---|---|
| 920,345 | Kolodziej | May 4, 1909 |
| 2,224,045 | Gibbs | Dec. 3, 1940 |
| 2,559,434 | Hyland | July 3, 1951 |